United States Patent [19]

Showalter

[11] Patent Number: 4,506,861
[45] Date of Patent: Mar. 26, 1985

[54] SERVO VALVE FOR ULTRA-FAST PRESSURE REGULATION WITH CONTROLLED SYSTEM DAMPING

[75] Inventor: Merle R. Showalter, Madison, Wis.

[73] Assignee: Automotive Engine Associates, Madison, Wis.

[21] Appl. No.: 456,718

[22] Filed: Jan. 10, 1983

[51] Int. Cl.³ ............................................. F16K 31/06
[52] U.S. Cl. .................................. 251/139; 137/527; 137/856; 251/141
[58] Field of Search ................ 251/139, 141; 137/527, 137/855–858

[56] References Cited

U.S. PATENT DOCUMENTS

| | | | |
|---|---|---|---|
| 322,795 | 7/1885 | Coffield | 137/858 |
| 2,947,284 | 8/1960 | Nicholson | 251/139 X |
| 3,817,488 | 6/1974 | Mach | 251/139 X |
| 3,873,060 | 3/1975 | Espenschield | 251/139 X |
| 4,089,348 | 5/1978 | Yoshida | 251/139 X |

*Primary Examiner*—Robert G. Nilson
*Attorney, Agent, or Firm*—Witherspoon & Hargest

[57] ABSTRACT

A liquid flow control servo valve where the flow controlling element is a magnetically loaded hydrostatic step bearing. An electromagnet has a central liquid passage 3 through it, and flow from this passage 3 is closed off by a magnetically permeable flat plate which has a planar surface matching a corresponding planar surface of the electromagnet. Pressure from passage 3 floats the plate on a thin liquid film in the manner of a hydrostatic step bearing, and the film thickness of this liquid film rapidly adjusts until the hydrostatic bearing pressure force W balances the magnetic forces on the plate. This variation in film thickness adjusts flow rate past the plate. The flow and pressure drop across the hydrostatic bearing plate rapidly adjusts to coil current in the low hysteresis electromagnet, so that P across the plate varies nearly in proportion to coil current I. The geometry of the hydrostatic bearing can be tailored to produce a wide range of viscous damping characterization using conventional squeeze film equations. So long as flow in the step bearing is laminar, the ratio of critical damping produced by the valve in a particular installation is invariant over a wide operating range of flows and fluid viscosities.

10 Claims, 5 Drawing Figures

$$W = -\frac{3\pi\mu r^4}{2h^3}\frac{dh}{dt}$$
— Fig. 4 —
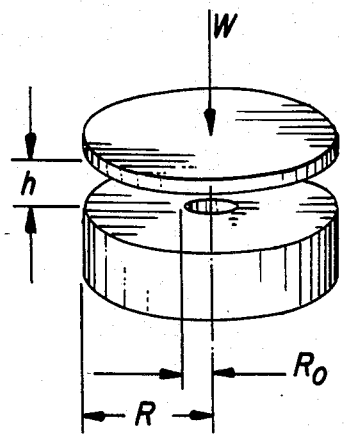
$$W = -\frac{3\pi\mu}{2h^3}\left[R^4 - R_0^4 - \frac{(R^2-R_0^2)^2}{\log R/R_0}\right]\frac{dh}{dt}$$
Fig. 5

SERVO VALVE FOR ULTRA-FAST PRESSURE REGULATION WITH CONTROLLED SYSTEM DAMPING

BACKGROUND AND OBJECTS

Servo controlled valves for controlling pressure or pressure differential are important in many hydraulic servo systems and have a large number of potential uses in fuel metering, fluid metering, and other technical fields. Servo valves for this purpose commonly have been rather complicated, underdamped and therefore prone to oscillation, and expensive. Current valves also have significant problems with stiction and other hysteretic characteristics which greatly complicate the design and accuracy of design of the servo mechanisms of which they form a part.

It is the purpose of the present invention to provide a pressure differential controlling servo valve where the pressure differential across the valve is a simple and smooth function of current, where the valve has no hysteretic or stiction characteristics, and where the speed of the valve is extremely fast (tau 1/e response on the order of a millisecond). It is a further purpose of the present invention to design such a servo valve having strong damping characteristics which can readily be designed to make servo system as a whole critically damped, or set at any other desired damping ratio. This damping feature will make it convenient for the servo designer to achieve stability and simplicity in his servo design.

The servo valve of the present invention is built on the basis of well-known laminar fluid mechanics, taking advantage of the very low magnetic hysteresis and rapid response characteristics of ferrite materials. A ferrite magnet constructed geometrically in a manner very similar to that of pot cores which are used conventionally in many high frequency circuits exerts a magnetic force on a floating plate which responds instantaneously to coil current variation and this magnetic force is resisted by an equal and opposite pressure force caused by the pressure differential across the plate so that the plate floats on a film or fuel or other liquid in the manner of the hydrostatic bearing (the characteristics of which can be exactly calculated). Changes in the film thickness separating the plate from the ferrite magnet rapidly change liquid flow across the valve. Film thickness changes are damped by the well-known squeeze film effect, and by proper choice of dimensions and radius ratios it is possible to control the squeeze film damping of the plate over a very wide range to control the damping characteristics of the valve in a manner convenient to the servo designer. The servo valve is a magnetically actuated hydrostatic bearing with squeeze film damping. As such, the servo valve can be built with very rapid and analytically predictable response, exactly calculable damping, and zero mechanical hysteresis and stiction. The valve is inexpensive to make and durable so long as magnetic particles are carefully filtered from the fluid flowing past the servo valve. These desirable characteristics are achieved in detail as follows.

IN THE DRAWINGS

Figure 1:
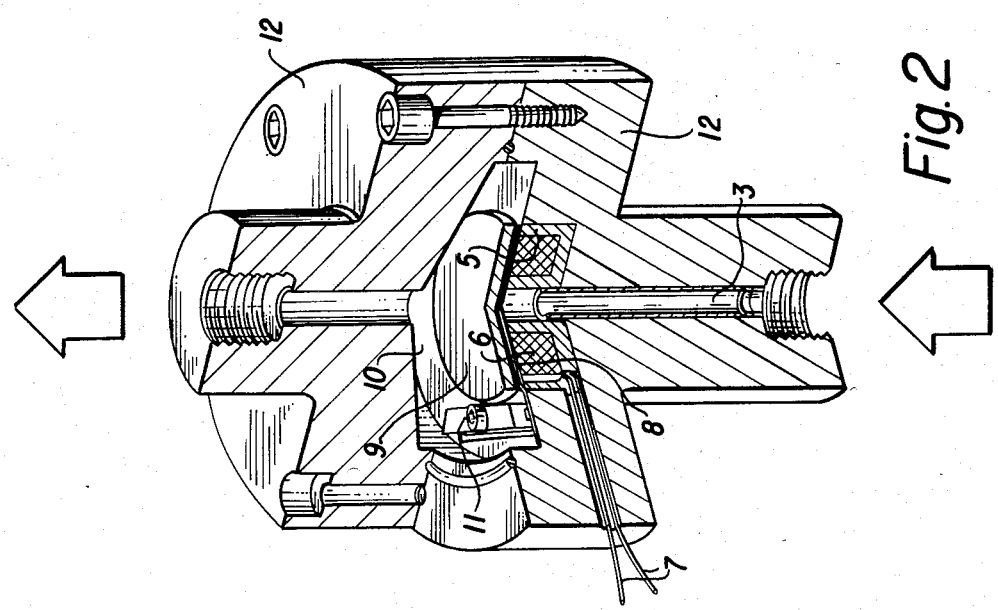
FIG. 1 is a cross sectional view of the servo valve in a housing showing a potted coil of wire enclosed in a ferrite pot core geometry to form the ferrite electromagnet, the ferrite plate which engages the electromagnet as a hydrostatic bearing, a flapper mounting for the plate and the housing for the valve.
Figure 2:
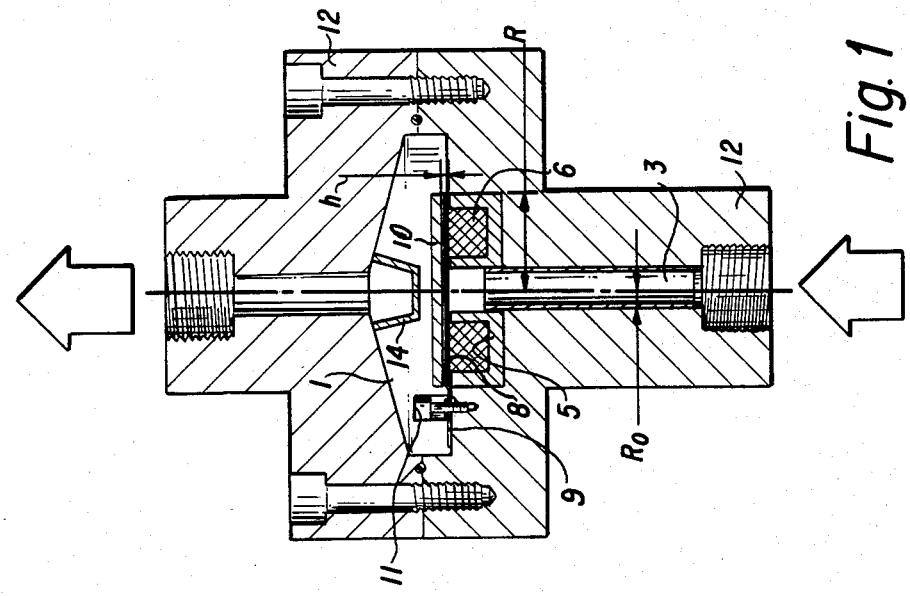
FIG. 2 is a perspective drawing of the valve of FIG. 1, showing more clearly the geometry of the ferrite electro-magnet and flap mounted plate which together form the servo valve.
Figure 3:
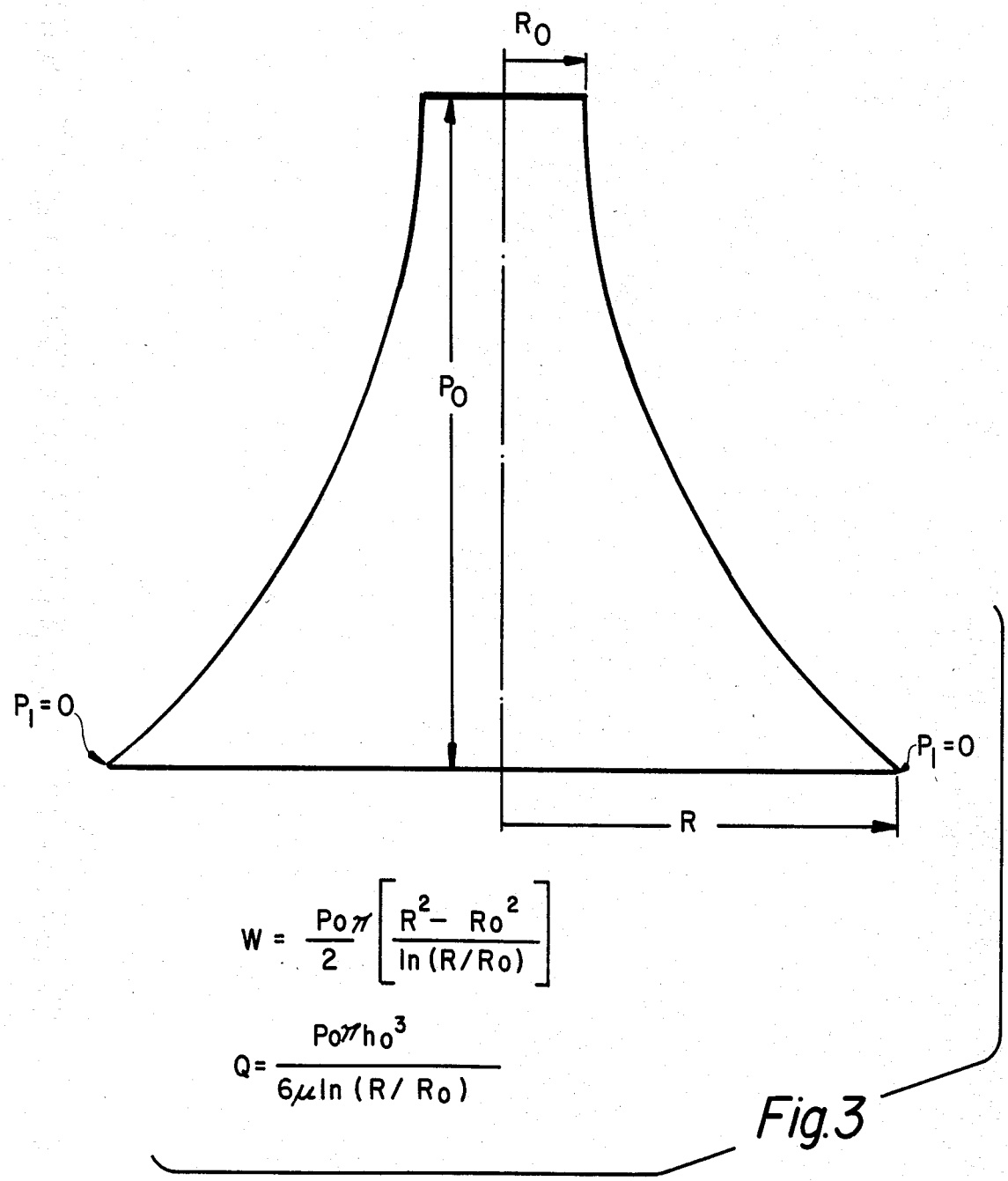

FIG. 3 is a diagram with accompanying equations for a hydrostatic circular bearing having the characteristics shown in the valve of FIG. 1 and FIG. 2. The sketch and equations are re-drawn from "Hydrostatic Lubrication" by Dudley D. Fuller. Pages 3–18 from *Standard Handbook of Lubrication Engineering*, McGraw-Hill, 1968. FIG. 3 and its accompanying equations show how the fuel valve acts as a hydrostatic bearing and serves to control fluid flow, equilibrating the hydrostatic film force to the magnetic force.

FIGS. 4 and 5 illustrate squeeze film fluid forces which serve to damp the valve in an analytically convenient way. FIG. 4 is taken from "Squeeze Films" by Frank R. Archibald, Chapter 7 of the *Standard Handbook of Lubrication Engineering*, op. cit., and illustrates the geometry of a solid circular disk squeeze film to illustrate some of the fluid mechanics characteristic of the damping of the servo valve. FIG. 5 is redrawn from Archibald's article to match $R/R_o$ to FIG. 1 but is basically taken from Page 7-6 of Archibald's article and shows the squeeze film damping of a hollow circular disc. The hollow circular disk squeeze film damping shown matches the damping of the servo valve of FIGS. 1 and 2.

DETAILED DISCUSSION

See FIGS. 1 and 2. Servo assembly 5, 6, 7, 9, and 10 is mounted in housing 12 and liquid flows from the passage 3 between the parallel circular planes of ferrite plate 10 and flat planar electromagnet surface 8 into the passage 1 flowing in the direction of the arrow. The clearance between the circular plane 8 of ferrite electromagnet 5, 6, 7 and ferrite flapper plate assembly 9, 10 is film thickness h. Flow for a set pressure differential across plate 9, 10 is proportional to $h^3$; and damping forces due to squeeze films are inversely proportional to $h^3$. Flow for a set film thickness is proportional to fluid viscosity; and the damping force for a set film thickness is also proportional to fluid viscosity. Therefore, the damping ratios of the servo valve in a servo system are insensitive to the viscosity of the fluid on which the servo system operates. Ferrite pot core geometry 5 is closely analogous to the pot cores commercially used in transformers of many high frequency circuits, has negligible magnetic hysteresis at the frequencies at which any servo valve operates, and includes within it a coil of wire 6 which is potted in a gasoline resistant epoxy or other plastic so that the top plane 8 of the pot core assembly 5, 6 forms a geometrically smooth flat plane which engages the lower surface of film 10 below ferrite plate 9.

Corresponding to planar surface 8 of the electromagnet assembly 5, 6 is the surface of a thin elastomeric sheet 10 which is glued to ferrite disc 9. The circular planar surface corresponding to plate 9 on film 10 corresponds to plane 8, and the space between the circular planar surface and plane 8 forms the geometry of a circular hydrostatic film bearing where the pressure differential between the chambers of 1 and 3 forces the planes apart and the pressure generated force is balanced by magnetic forces. The film thickness between the surface of 10 and plane 8 is shown (greatly exaggerated) as film thickness h. Elastomeric film 10, which may be made of polyurethane, is clamped at clamp assembly 11 so that the ferrite plate 9 is roughly aligned with respect to the electromagnet by a flapper which forms a floppy elastic hinge characterized by negligible damping and essentially zero mechanical hysteresis. A mechanical stop 14, which should be of magnetically impermeable material, constrains the maximum film thickness h between flapper assembly 9, 10 and the electromagnet planar surface 8.

The physical operation of the servo valve assembly formed between electromagnet 5, 6 and flapper 9, 10 is straightforward. The electromagnetic force in the ferrite electromagnet is proportional to N (the number of turns in the coil) and I (the current). The ferrite part of flapper 9 is separated by a thin magnetically impermeable film 10 from plane 8. This film serves as a spacer, and is arranged so that the range of magnetic force pulling ferrite 9 into the electromagnet for a set current varies less than 2:1 within the range of film thickness h over which the valve operates. Plate flapper 9, 10 floats as a hydrostatic full film bearing where the film pressure forces balance the magnetic forces. The motion of plate 9 is characterized by essentially zero static friction and mechanical hysteresis. The magnetic materials of which the valve is constructed (ferrite) have essentially zero magnetic hysteresis and effectively instantaneous time response to changes of current in the coil. Motion of flapper 9, 10 with respect to plane 8 is damped by squeeze film damping forces characteristic of a hollow circular disc.

The physical characteristics of the servo valve are described in more detail with respect to FIGS. 3, 4, and 5. FIG. 3 is modified from FIG. 15 of "Hydrostatic Lubrication" by Dudley D. Fuller, Chapter 3, Page 18 from *Standard Handbook of Lubrication Engineering*, McGraw-Hill Book Company, 1968, to show the performance of a circular hydrostatic step bearing, which the servo valve is from a bearing point of view. See FIG. 3. Pressure over the circle of radius $R_o$ (the pressure in passage 3) declines in the step bearing as the flow flows radially to zero at $R_o$. (The pressure downstream of flapper assembly 9, 10 is set at zero for the purpose of the computation). The total integrated force of the fluid in the film tending to separate flapper 9, 10 from plane 8 is W where:

$$W = \frac{P_o \pi}{2} \left[ \frac{R^2 - R_o^2}{\ln(R/R_o)} \right]$$

where
  R = outside radius of the bearing, in.
  $R_o$ = recess radius of the bearing, in.
  ln = logarithm to the base e
  $p_o$ = supply pressure, psi The flow of fluid past the hydrostatic bearing (the fluid flow metered by the servo valve) Q is:

$$Q = \frac{P_o \pi h^3}{6 \ln(R/R_o)}$$

where
  W = applied load, lb
  h = film thickness on the sill, in.
  Q = rate of flow, cu in./sec
  $\mu$ = absolute viscosity, reyns (lb-sec/sq. in.)

For equilibrium of flapper plate 9, 10, W is balanced with magnetic forces from the electromagnet magnet assembly 5, 6.

Investigation of the flow equation, $$Q = \frac{P_o \pi h^3}{6 \, \text{Ln}(R/R_o)}$$

is relevant to the performance of the valve. Flow through the film is proportional to the viscosity and to the cube of the film thickness. In addition, the flow through the hydrostatic bearing film is not a function of the absolute value of either R or $R_o$, but is, rather uniquely determined by the ratio $R/R_o$ as long as flow in the hydrostatic bearing is laminar and not turbulent (as long as h is sufficiently thin). Two hydrostatic bearings with the same bearing thickness and the same ratio or $R/R_o$ will have the same flow for the same pressure differential across the bearing even though one may be twice the radius of the other. Moreover, the flow Q is relatively insensitive to the ratio $R/R_o$ itself, since it varies only as the logarithm of this ratio. In summary, flow Q is proportional to viscosity, a cubic function of film thickness and a weak function of $R/R_o$.

So long as the thickness h separating flapper 9, 10 from plane 8 is constant, the equations shown above are exactly true for film thicknesses thin enough so that the flows are laminar. However, changes in h are damped by the squeeze film effect. FIGS. 4 and 5 are set out from chapter 7 of the *Standard Handbook of Lubrication Engineering*, op. cit. from the chapter "Squeeze Films" by Frank R. Archibald. The basic physics of squeeze films is summarized well by Archibald in the first sentence of that chapter "When a film of viscous fluid is forced out from between a pair of approaching surfaces, pressures are developed which resist the tendancy of the surfaces to come together." Under such conditions the fluid layer is described as a "squeeze film." Because viscous flow is a phenomenon described by linear equations, squeeze film effects can be validly combined with the flow effects of the hydrostatic bearing using the mathematical principle of superposition. FIG. 4 is a sketch of the geometry of a solid circular disc, taken from Archibald's Page 7-5 to illustrate the effect of squeeze film fluid mechanics. The squeeze film force $W_s$ is equal to $$W_s = -\frac{3 \pi \mu r^4}{2h^3} \frac{dh}{dt} .$$

Note that this squeeze film force $W_s$ is proportional to viscosity, inversely proportional to the cube of the film thickness, proportional to the rate of thinning of the film, dh/dt, and proportional to the fourth power of the radius. Squeeze film damping forces are therefore very sensitive to absolute values of radius (while flow characteristics are independent of radius for a set $R/R_o$ and vary as the logarithm of $R/R_o$ varies). The contrast in the functional dependence of damping forces to geometry compared to flow geometry makes it possible to control a hydrostatic magnetic servo valve of the current design over a very wide range of damping ratios.

FIG. 5 is redrawn from a corresponding figure in Archibald's article to match the $R/R_o$ ratio of FIG. 1, but basically shows the squeeze film damping of a hollow circular disc, which is the squeeze film case represented by FIG. 1. The damping force $W_s$ characteristic of this case is shown in FIG. 5. The equation is:

$$W_s = - \frac{3\pi\mu}{2h^3} \left[ R^4 - R_o^4 - \frac{(R^2 - R_o^2)^2}{\log R/R_o} \right] \frac{dh}{dt}$$

This equation is not as sensitive to radius variations as the equation for a simple circular disc, but it is almost so for $R/R_o$ greater than 4 and is still extremely sensitive for $R/R_o$ ratios greater than 2. For example, the servo valve assembly in FIGS. 1 and 2 has a ratio $R/R_o=5.0$. Consider two geometrically similar servo valves in proportion to FIG. 1, with Case 1 having $R=0.75$ inches and $R_o=0.15$ inches, and with Case 2 having $R=1.5$ inches and $R=0.30$ inches. Since $R_o$ is the same in the two cases, flow for a set pressure differential is the same for the same film thickness h in both cases. However, the damping force per unit dh/dt varies radically. In Case 1 the equation is:

$$W_{d1} = \frac{3\pi\mu}{2h^3} [.1347] \frac{dh}{dt}.$$

In Case 2 the equation is:

$$W_{d2} = \frac{3\pi\mu}{2h^3} [2.155] \frac{dh}{dt}.$$

The ratio of damping forces $W_{d2}/W_{d1}=15.998$, which closely approximates the 16.0 which would be true for the solid circular disc case. The servo valves considered in Case 1 and Case 2, normalizing for the same pressure differential, would have a servo mechanism damping ratio different by 16:1. It should be clear to those skilled in the servo mechanical arts that by changing the relative proportions of a servo valve such as that described in FIGS. 1 and 2, a rapid response servo valve can be made with damping characteristics which may be tailored over a wide range. For many servo systems, for example a fuel metering internal combustion engine system on which A.E.A. is working, the relationship between squeeze film damping and flow (since both vary as viscosity and the cube of film thickness h) forms a servo system which is critically damped and nearly linear with a very simple pure gain servo system.

Various practical considerations apply to the fabrication and use of the servo valve of the present invention. Although the servo valve is selfflushing with respect to non-magnetic particles, magnetic particles accumulate on the electromagnet surface 8 and rapidly cause catastrophic degradation of servo mechanism valve performance. In consequence, it is imperative that the servo valve of the present invention be operated with an efficient particle filter system. Such systems, which can simply be made with permanent ferrite magnets, are inexpensive. Another issue concerns the performance of the unit when started up from rest after a period at zero current. Characteristically, the elctromagnet will have residual magnetism which will pull flapper plate assembly 9, 10 against electromagnet surface 8. Over time, squeeze film effects may make this film exceptionally thin and therefore produce a significant lag before the film lifts off, since squeeze film effects are very strong for very thin films. It is therefore useful to slightly roughen the surface of elastomeric film 9 which contacts plane 8, so that the surface is "leaky" at very low film thicknesses. This characteristic must be purchased at the cost of a total shutoff characteristic, but often this price is worth paying. Cooling of the servo valve is typically not a problem, since liquid flow through the fluid film carries away heat, but a problem may occur in some applications. It is straightforward in both principle and practice to use servo valves such as that shown in FIG. 1 in series. (If very large pressure differentials are required, utilization of these valves in series is required). It is also straightforward to employ servo valves according to the present invention in parallel so long as stop arrangements such as 14 in FIG. 1 are included and heat transfer characteristics in the various coils are accomodated. In a parallel flow situation, it may happen that one of the flapper valves stays completely closed until another of the flapper valves is fully against the stops, because of the declining magnetic force with increasing gap characteristic of the servo valve. So long as heat transfer from the coils is reasonable, this should be tolerable.

The magnetic-hydrostatic servo valve of the present invention is inexpensive, extremely rapid, tailorable to a wide range of damping ratios for servo mechanical applications and characterized by zero hysteresis. It should be convenient to use in a number of servo mechanical applications.

Although FIGS. 1 and 2 describe a central circular hydrostatic bearing geometry, it should be apparent tht the same operation could be obtained with elliptical or rectangular hydrostatic bearing geometries.

I claim:

1. A pressure differential controlling servo valve wherein the pressure differential across the valve is a simple and smooth function of electric current, said valve comprising a housing having a centrally positioned inlet and an outlet, a ferrite electromagnet positioned within the housing in flow communication with the inlet, said ferrite electromagnet comprising a torroidal ferrite body with a core of coiled wire within said torroidal body, said wire core being potted in said torroidal body by a gasoline resistant substance, the central opening formed by the torroidal body surrounding the housing inlet, the ferrite electromagnet having a top and a bottom, the top of the electromagnet having a smooth planar surface perpendicular to the housing inlet, a ferrite disk having a top and a bottom surface and sized to be coextensive with the electromagnet body, a magnetically impermeable film secured to the bottom surface of said ferrite disk and generally coextensive therewith, said film having a tongue extending outwardly beyond the edge of the ferrite disk, said disk being positioned on the top planar surface of the electromagnet with the film in confronting relation thereto, clamping means for securing the film tongue to the housing to hingedly retain the disk in position for back and forth movement with respect to the top planar surface of the electromagnet.

said housing having an outlet chamber in flow communication with the outlet and adapted to receive flow from the inlet when the ferrite disk is raised away from the top planar surface of the electromagnet, and whereby the fluid in the inlet passes between the film and the top planar surface of the electromagnet to provide a hydrostatic full film bearing so that the hydrostatic full film pressure forces balance the magnetic forces and thereby insures nonimpaired and smooth response to current flow into the electromagnet.

2. A fluid flow control servo valve where the flow controlling element is a magnetically loaded hydrostatic step bearing constructed as follows:

an electromagnet has a central fluid passage through it, and the outlet of said central passage is on a flat planar electromagnet surface which forms one surface of a hydrostatic step bearing a magnetically permeable closure element which has a flat planar closure surface corresponding to said planar electromagnet surface, where said closure element is stiff so as to maintain said closure surface truly flat under the magnetic and pressure forces to which said closure element is subjected, and where said closure element is mounted elastically so that it can move to increase or decrease the distance between said closure surface and said electromagnet surface wherein the magnetic forces between said electromagnet and said closure element act to force said closure surface directly against said electromagnet surface and wherein the pressure differential between the central fluid passage and the periphery of said closure surface causes a sheet of fluid to flow between said closure surface and said electromagnet surface separating the surfaces whereby said closure surface floats on said fluid as a magnetically loaded hydrostatic step bearing and the force balance and flow relations of fluid flow between said surfaces are dominated by viscous drag wherein the film thickness of the fluid film between said electromagnet surface and said closure element surface rapidly adjusts to establish a force balance between the hydrostatic bearing pressure W and the force from the electromagnet on said plate.

3. The invention as stated in claim 2 and wherein said electromagnet and said magnetically permeable closure element are constructed of very low magnetic hysteresis materials such as ferrite for rapid electromagnetic response.

4. The invention as stated in claim 2 and wherein said closure element is held in position to operate in hydrostatic bearing mode by a relatively floppy and flexible elastic mounting characterized by negligible mechanical hysteresis, so that mechanical hysteresis of said servo valve can be eliminated.

5. The invention as stated in claim 2 and wherein a thin spacer film of magnetically impermeable material is placed between the planar surfaces of said closure element and said electromagnet so as to flatten the magnetic force versus distance curve on which the servo valve operates.

6. The invention as stated in claim 2 and wherein the maximum film thickness h of said closures element is constrained by a mechanical stop limiting travel of said plate away from said electromagnet.

7. The invention as described in claim 2, and wherein the geometrical planes of said closure element and said electromagnet which form the hydrostatic step bearing have sufficient surface roughness that they do not lock together excessively due to residual magnetism during shut down periods.

8. The invention as stated in claim 2 and wherein the flat planar surfaces of said electromagnet and said closure element are arranged so that the sheet of fluid flowing between said surfaces is in the form of a circular disk and wherein the outlet of the fluid passage in said electromagnet is central with respect to said fluid disk.

9. The invention as stated in claim 8 and wherein the flat planar surfaces of said electromagnet and said closure element are arranged so that the absolute value of the fluid disk radius produces a specified degree of squeeze film damping of the motion of said closure element to produce damping of the fluid control system of which the fluid flow control servo valve is a part.

10. The invention as described in claim 2 and wherein the geometrical planes of said closure element and said electromagnet which form the hydrostatic step bearing have surface roughness in excess of 4 microinches.

* * * * *